Aug. 14, 1923.

C. WEICHOLD, JR 1,464,591

LOCK NUT

Filed March 16, 1920

Charles Weichold Jr.,
INVENTOR.
By John W. Strehli
ATTORNEY.

Patented Aug. 14, 1923.

1,464,591

UNITED STATES PATENT OFFICE.

CHARLES WEICHOLD, JR., OF CINCINNATI, OHIO.

LOCK NUT.

Application filed March 16, 1920. Serial No. 366,356.

*To all whom it may concern:*

Be it known that I, CHARLES WEICHOLD, Jr., a citizen of the United States, residing at the city of Cincinnati, in the county of Hamilton and State of Ohio, have invented certain new and useful Improvements in Lock Nuts, of which the following is a specification.

The object of my invention is to produce a simple, cheap and highly efficient lock nut, possessing marked utility.

My new lock nut can be thoroughly and perfectly screwed into a locked position, and can also be removed by human agency, but the lock nut will not become displaced by expansion and contraction, or by rattling and jars, but always maintain a normal locked position, which it has originally been forced to assume.

My new lock nut can be locked into final position by the same wrench which is used in placing it in an initial position. By using my new lock nut, double nuts, lock washers and other costly and extraneous devices are dispensed with.

I produce a lock nut which contains the lock and the nut in an integral construction or device.

In carrying my invention into effect, I produce a nut from one piece of material, however, formed into two parts by placing near the edge of the inner face, a depression or annular groove, extending inward toward the thread of the nut. The width and depth of this depression or groove is determined by the size of the nut and its bore, the object being to create an integral weaker part or head at one end of the nut and a stronger part or body at the other end of the nut, these parts being separated by a thin annular neck.

In the accompanying drawing, forming part of this specification:

Figure 2:
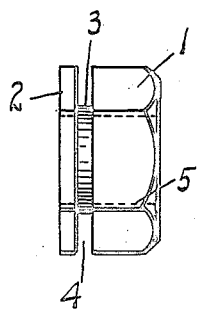
Fig. 2, is a side elevation thereof.
Figure 1:
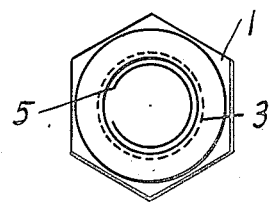
Fig. 1, is a plan view of the lock nut.

The lock nut is formed of the strong part or body 1 and the weaker part or head 2 joined by a thin annular neck 3, forming the bottom of the annular groove 4. All these elements are integral, and a screw thread, 5 passes entirely through the elements 1, 2 and 3 and is preferably of the same pitch throughout its length. The pitch of the screw threads and their fineness or coarseness may be varied to suit the functions which the lock nut is designed to perform in connection with the threads 6 of the bolt 7, with which it is to be used, and the threads on the bolt 7 may also vary to properly coact with the lock nut screw threads. The head of the bolt 7 and the lock nut may be square, rectangular, oval, hegagon or any other desired shape and contour.

In the drawing as illustrated, the bolt 7, is seen passing through a member 8, which may be any object or material or part through which the bolt is intended to pass and against which the lock nut weaker part 2 abuts when the lock nut is screwed home and locked.

The hole through which the bolt is passed should be slightly larger than the bolt, as shown in the drawing, for a purpose hereinafter pointed out.

Figure 3:
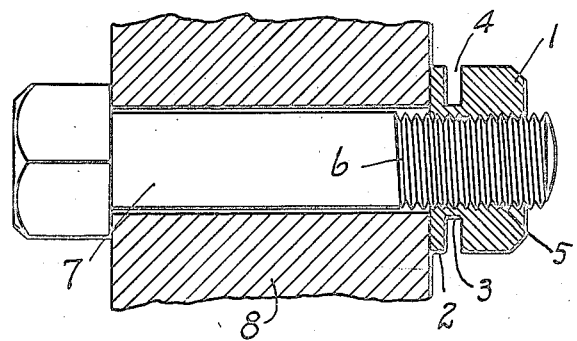
Fig. 3, is a section of material of any kind, through which a bolt is shown in elevation, my lock nut being shown on the bolt, and in section, the lock nut having been screwed to its initial position on the screws of the bolt.
Figure 4:
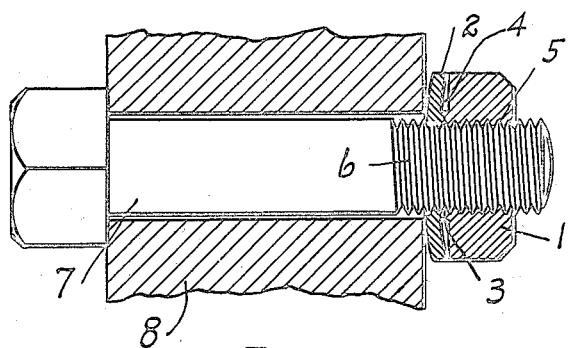
Fig. 4, is a similar view to that shown in Fig. 3, except that the parts are shown in their final position.
Figure 5:
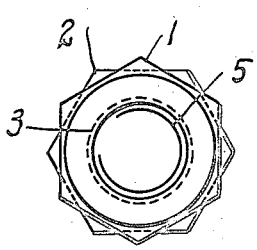
Fig. 5, is a plan view of the lock nut in final position, the weaker part hugging the stronger part as shown in Fig. 4, the view being taken, by looking down on the end of the lock nut and bolt end, in Fig. 4, to illustrate the relative positions assumed by the two parts of the lock nut, and, Fig. 6, is a perspective view of the lock nut, in modified form.

When the lock nut is used, it is screwed onto the bolt as shown in Fig. 3, the inner weak part 2 pressing its face against the object against which the lock nut has been screwed (in the present instance, marked 8). In screwing the lock nut home in this manner, the wrench used grips both parts 1 and 2 and when it has been screwed as tightly as possible, the wrench is removed and the operator'then places his wrench onto the strong part 1 alone, and applies great power to the wrench so that the strong part 1 will force the part 2 tightly against the part 8, and the edge of the hole will act as a fulcrum and bend the part 2 into dish-shape, causing a distention of the nut threads at the neck portion. Subsequently the neck 3 will be twisted and a further locking action will take place due to the breaking and mutilating of the neck 3. This locking of the nut forces the part 2 to hug, impinge against and partly envelop the strong part 1 and thus absolutely locks it against displacement, except by extraordinary human effort. It will be seen that I form a double lock nut; I clamp the bolt when the neck between the parts 1 and 2 is mutilated and I force the weaker part 1 to change from a flat element to a concave element and hug the stronger part 1 and clamp it tightly, locking the nut onto the bolt by a double grip.

Various attempts have been made to evolve practical lock nuts of this particular character, but all such attempts have proven futile. For example, a lock nut has been made and patented, composed of two parts connected by a thin neck and all made integral similar to my lock nut, however, the groove dividing the nut into two parts was placed in the center, thus dividing the nut into two parts similar to one another, each of the same size, strength and outline. This form of lock nut does nothing more than have its thin neck part mutilated to thus clamp the bolt and this ends its function, as the two parts making up the nut being equal in thickness and strength produce only ordinary frictional contact.

I accomplish, with my invention another and more important result, that is, by making a weak and a strong part; the strong part concaves the weak part and forces said weak part to bend over and to hug the strong part; thus making my lock nut one of practicability and utility and a novel article of manufacture, over the other lock nut just described, which is impracticable and useless.

Figure 6:
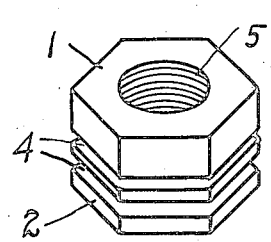

In Fig. 6, I show two depressions or grooves 4, and in such a construction, the lock nut will be divided into three sections and when the outer nut part 1, is screwed home for final locking, the smaller or weaker part adjacent to said part 1, will concave and partly envelope said part 1 and the inner part 2 will act as a washer. In this construction the parts 2 can be of the same thickness or one may be thinner than the other.

The new result which I attribute to my lock nut, I have discovered by much thought and experiment.

I wish to be understood as claiming any modified form of my new lock nut falling within the scope of appended claim.

What I claim as new and my invention and desire to secure by Letters Patent, is:

A lock nut including integral body, annular neck and head portions provided with a bore extending entirely through said portions and threaded from end to end to receive the screw-threads of a bolt, said head portion being sufficiently thin to bend toward and engage the body portion when the head abuts against an unyielding surface and the body portion is screwed up on the bolt, and said neck portion being sufficiently thin radially to distort circumferentially and mutilate the portion of the thread of its bore when the body portion is tightened sufficiently to bend the head portion.

In testimony whereof, I affix my signature at Cincinnati, Ohio, this 30th day of January, 1920.

CHARLES WEICHOLD, Jr.